(12) United States Patent
Baudat (10) Patent No.: US 7,648,016 B2
(45) Date of Patent: *Jan. 19, 2010

(54) CURRENCY VALIDATOR

(75) Inventor: Gaston Baudat, Glenmore, PA (US)

(73) Assignee: MEI, Inc., West Chester, PA (US)

( * ) Notice: Subject to any disclaimer, the term of this patent is extended or adjusted under 35 U.S.C. 154(b) by 444 days.

This patent is subject to a terminal disclaimer.

(21) Appl. No.: 10/518,691

(22) PCT Filed: Jun. 18, 2003

(86) PCT No.: PCT/IB03/03128

§ 371 (c)(1),
(2), (4) Date: Mar. 3, 2006

(87) PCT Pub. No.: WO04/001683

PCT Pub. Date: Dec. 31, 2003

(65) Prior Publication Data

US 2006/0254876 A1    Nov. 16, 2006

(51) Int. Cl.
*G07D 7/00* (2006.01)
(52) U.S. Cl. ..................................... 194/302; 194/206
(58) Field of Classification Search ................. 209/534; 382/134, 135
See application file for complete search history.

(56) References Cited

U.S. PATENT DOCUMENTS

| 5,649,068 | A | 7/1997 | Boser et al. |
| 5,678,677 | A | 10/1997 | Baudat |
| 5,757,001 | A * | 5/1998 | Burns ..................... 250/339.11 |
| 5,992,600 | A | 11/1999 | Baudat |
| 6,588,571 | B1 | 7/2003 | Baudat |
| 6,899,215 | B2 * | 5/2005 | Baudat et al. ................ 194/328 |
| 7,000,754 | B2 | 2/2006 | Baudat et al. |
| 7,073,652 | B2 | 7/2006 | Baudat |

FOREIGN PATENT DOCUMENTS

| EP | 0480736 A | 4/1992 |
| EP | 0887761 A2 | 12/1998 |
| EP | 0887761 A2 * | 12/1998 |
| GB | 2254949 A | 10/1992 |
| GB | 2254949 A * | 10/1992 |
| JP | 11-073406 | 3/1999 |
| WO | 00/33262 | 6/2000 |

OTHER PUBLICATIONS

Frosini et al., "A Neural Network-Based Model for Paper Currency Recognition and Verification," IEEE Transactions On Neural Networks, 7(6):1482-1490, Nov. 1996.

Burges, Christopher, "A Tutorial on Support Vector Machines for Pattern Recognition," Data Mining and Knowledge Discovery 2:121-167 (1998).

Scholkopf et al., "Input Space Versus Feature Space in Kernel-Based Methods," IEEE Transactions on Neural Networks 10 (5): 1000-1017 (1999).

* cited by examiner

*Primary Examiner*—Jeffrey A Shapiro
(74) *Attorney, Agent, or Firm*—Fish & Richardson P.C.

(57) ABSTRACT

A method of deriving a function for classifying items of currency. The method comprises processing training data vectors corresponding to features of a plurality of currency items, and derives a support vector machine classification function involving a plurality of support vectors.

23 Claims, 3 Drawing Sheets

CURRENCY VALIDATOR

The invention relates to currency validators and methods for adapting and operating currency validators. In this specification, the terms currency and currency items are intended to include coins, tokens and the like, banknotes and bills, other value sheets such as cheques, vouchers, bonds, and includes both genuine items and counterfeits, such as slugs and washers.

There are many known methods for determining the denomination of a currency item and distinguishing between genuine and fake currency items. Commonly, a currency item is sensed by one or more sensors, such as electromagnetic or optical sensors, to produce signals representative of certain characteristics of the currency item, such as coin thickness, coin material, or the pattern on a banknote. Those measured signals are then compared with stored reference data representative of known currency items, and, depending on the outcome of the comparison, the measured currency item is classified, for example, as a genuine currency item of a particular denomination, a known fake, or simply as unknown.

For example, it is known to store reference data for known currency items in the form of sets of "windows", which consist of upper and lower limits. If each of the measured signals for a particular item falls within each of the corresponding windows for a particular denomination, it is classified as belonging to that particular denomination. This approach can be viewed generally as using boundaries in the space having axes corresponding to the measured characteristics, known as acceptance boundaries, which are linear.

Usually, distributions of populations of particular denominations of currency items are non-linear, in which case, linear acceptance boundaries may not be sufficiently accurate to distinguish between different denominations. Another known method stores reference data which describe elliptical boundaries corresponding to specific denominations of currency items. Similarly to the approach mentioned above, measured currency items are classified according to whether or not the measured characteristics fall within or outside those elliptical boundaries. Such a method is described in, for example, GB 2 254 949A.

In many cases, the boundaries between different denominations of currency items are complicated and cannot be reflected sufficiently accurately by linear or elliptical boundaries. Known techniques for finding non-linear acceptance boundaries can result in less than ideal results for currency validators. Clearly, it is particularly important to be able to classify and validate items of currency accurately, for example, in a vending machine, where there is potential loss of revenue.

The invention provides an alternative method of deriving and using a classification function, especially for classifying items of currency.

The invention provides a method of deriving a classifying function using a set of data, the elements of the data set corresponding to points in a first space, selecting a kernel function corresponding to a mapping of the first space to a second space, deriving a subset of the data set such that the image of the subset under the mapping in the second space is representative of the image of the data set under the mapping in the second space, and deriving a classification function in the form of a support vector machine classification function expressed in terms of said subset of feature vectors.

Alternatively, the invention provides a method of deriving a classification function by processing training data, corresponding to points in a first space, the method comprising deriving a support vector machine classification function using said training data, the method further comprising selecting a kernel function corresponding to a mapping from the first space to a second space, the method comprising selecting a subset of the training data set, where the image of the subset in the second space is representative of the image of the training data set in the second space, and expressing the support vector machine classification function in terms of the subset.

For example, the method may involve deriving a plurality of measurements from at least one currency sensor and a plurality of items, and forming a set of data from the measurements, the elements of the data set corresponding to points in said first space.

The invention also provides a corresponding classification function, classifying method, and classifier (classification apparatus).

Preferably, aspects of the invention are used to derive a function for use in manufacturing, adapting or operating a device such as a currency validator.

The invention is especially intended for use in relation to currency items, for deriving a classification function for, and for classifying, denominating or validating, currency items (methods and apparatus). In such cases, for example, the data may be derived from measurements of one or more characteristics of currency items, or from one or more sensors for sensing currency items.

The invention also provides the use of support vector machines for classification of currency items.

Other aspects of the invention are set out in the accompanying claims.

Embodiments of the invention will be described with reference to the accompanying drawings of which.

According to a preferred embodiment, the present invention uses kernel functions to analyse data derived from currency items and currency sensors to derive classification functions, or acceptance boundaries, for validators. More particularly, the data is measured data derived from currency items, such as coins and banknotes, the data being representative of characteristics of currency items, such as coin thickness, material, weight, width or the pattern on a banknote.

We shall begin with a generalised description of the theory underlying the invention, with reference to relatively simple data distributions, for clarity and ease of understanding. The invention will then be described in more detail in relation to embodiments relating to classification and validation of currency items.

An aspect of the invention relates to the use of kernel functions to select a subset from a set of data, the subset beings representative of the data set, in the context of the kernel function approach. More particularly, the subset is representative of the data set in the image space of a mapping 100 corresponding to a kernel function k. This aspect of the invention enables data analysis using kernel functions to be performed using less data, which reduces the complexity of the analysis and thus, for example, reduces computing effort and consequently costs when deriving classification functions for currency validators.

Another aspect of the invention relates to the use of support vector machines, as discussed below.

In the following, underlining is used to indicate vector quantities, except where a vector quantity is implicit from the context, and the term vector is generally intended to include scalar quantities (ie a vector of 1 dimension).

First, we shall describe the selection of a representative subset of a set of vectors.

Let X be a set of vectors, of size M.

$$X = \{\underline{x}_1, \underline{x}_2, \ldots, \underline{x}_M\}$$

Suppose that we map any vector from the input space X to a Hilbert space F through a nonlinear mapping function $\phi$:

$$\phi: X \to F$$

$$\underline{x} \to \phi(\underline{x})$$

Kernel functions are scalar valued functions complying with the Mercer's theorem.

A kernel function provides a direct way to compute a dot product in F using only the input space data. To simplify the notation let use $\phi_i = \phi(x_i)$. Then, it can be shown that for a kernal function k, there exists a corresponding mapping $\phi$ such that:

$$\phi_i^T \phi_j = k(x_i, x_j) = k_{i,j}$$

Examples of kernel functions are:

$$k_{i,j} = (x_i^T x_j + a)^d \quad d \in N\, a \in \mathbb{R} \quad \text{Polynomial}$$

$$k_{i,j} = e^{\frac{\|x_i - x_j\|}{\sigma^2}} \quad \sigma \in \mathbb{R} \quad \text{Gaussian}(RBF)$$

$$k_{i,j} = \tanh(a x_i^T x_j + b) \quad a, b \in \mathbb{R} \quad \text{Hyperbolic tangent(sigmoid)}$$

A consequence of this property is that if an algorithm can be expressed only with dot products, the image of the data in F can be analysed using only the data from the input space X, without even knowing $\phi(\underline{x})$.

With some kernels, such as the Gaussian, the dimensionality of F is infinite. The transformation from X to F is nonlinear and the dimensionality of F is often far larger than X.

Now, let S be a subset of X of size L.

$$S = \{\underline{x}_{s,1}, \underline{x}_{s,2}, \ldots, \underline{x}_{s,L}\}$$

We assume that there is a subset S which can approximate, or reconstruct, the image of the elements of X in F. In other words, S acts like a base expressing X in F space.

$$\text{Thus, } \hat{\phi}(\underline{x}_i) = \sum_{j=1}^{L} a_{ij} \phi(\underline{x}_{s,j}) \,\forall\, i \tag{1}$$

($\hat{\phi}(\underline{x}_i)$ is the approximation of $\phi(\underline{x}_i)$ using the image of S in F.)
To simplify let us use the following notation:

$$\underline{\phi}_i = \phi(\underline{x}_i)$$

$$\underline{\phi}_{s,j} = \phi(\underline{x}_{s,j})$$

then equation (1) can be written as:

$$\underline{\hat{\phi}}_i = \Phi_s \cdot \underline{a}_i \,\forall\, i \tag{2}$$

With
$\Phi_S = [\underline{\phi}_{s,1}, \underline{\phi}_{s,2}, \ldots, \underline{\phi}_{s,L}]$ a matrix formed from the image of S in F.
$\underline{a}_i = [a_{i,1}, a_{i,2}, \ldots, a_{iL}]^t$ a vector which expresses $\underline{\phi}_i$ using the image of S in F.

We wish to find values for $\underline{a}_i$ that minimize the relative differences $\delta_i$ between the image of the $i^{th}$ element of X, $\underline{\phi}_i$, and its reconstruction using the S set, $\underline{\hat{\phi}}_i$.

$$\underline{d}_i = \underline{\phi}_i - \underline{\hat{\phi}}_i \tag{3}$$

$$\delta_i = \frac{\|d_i\|^2}{\|\underline{\phi}_i\|^2} = \frac{(\underline{\phi}_i - \Phi_S \cdot \underline{a}_i)^t \cdot (\underline{\phi}_i - \Phi_S \cdot \underline{a}_i)}{\underline{\phi}_i^t \cdot \underline{\phi}_i}$$

$$\delta_i = 1 + \frac{\underline{a}_i^t (\Phi_S^t \Phi_S) \underline{a}_i - 2\underline{a}_i^t \Phi_S^t \underline{\phi}_i}{\underline{\phi}_i^t \cdot \underline{\phi}_i}$$

Minimization of the $\delta_i$ leads to:

$$\frac{\partial \delta_i}{\partial \underline{a}_i} = \frac{2(\Phi_S^t \Phi_S) \underline{a}_i - 2\Phi_S^t \underline{\phi}_i}{\underline{\phi}_i^t \cdot \underline{\phi}_i} = 0 \tag{4}$$

or $$\underline{a}_i = (\Phi_S^t \Phi_S)^{-1} \Phi_S^t \underline{\phi}_i$$

$(\Phi_S^t \Phi_S)^{-1}$ exists if the elements of the image of S in F are linearly independent. In other words, the rank of $\Phi_S$ is L.

Using the equations (3) & (4) we can write:

$$\delta_i = 1 - \frac{\underline{\phi}_i^t \Phi_S (\Phi_S^t \Phi_S)^{-1} \Phi_S^t \underline{\phi}_i}{\underline{\phi}_i^t \cdot \underline{\phi}_i} = \sin^2(\beta_i) \tag{5}$$

Where $\beta_i$ is the angle between the vectors and $\underline{\phi}_i$ and $\underline{\hat{\phi}}_i$, this implies we have minimized $|\beta_i|$ too.

Introducing now the kernel notation:

$$k(\underline{x}_p, \underline{x}_q) = \underline{\phi}_p^t \underline{\phi}_q$$

then equation 5) can be expressed as $$\delta_i = 1 - \frac{K_{s,i}^t \cdot K_{s,s}^{-1} \cdot K_{s,i}}{k(\underline{x}_i, \underline{x}_i)} \tag{6}$$

where $$K_{s,s} = [k(\underline{x}_{s,p}, \underline{x}_{s,q})]_{\substack{p=1,\ldots,L \\ q=1,\ldots,L}}$$

which is a L×L square matrix of the dot products of the image of S in F.
$K_{s,i} = [k(\underline{x}_{s,j}, \underline{x}_i)]_{j=1,\ldots,L}$ which is a vector of the dot products between the images of S and $\underline{x}_i$ in F.

As is known, and expressed above, the kernel function k expresses the dot product in F in terms of X.

Minimizing $\delta_i$ can be performed by maximizing:

$$J_i = \frac{K_{s,i}^t \cdot K_{s,s}^{-1} \cdot K_{s,i}}{k(\underline{x}_i, \underline{x}_i)} \tag{7}$$

$J_i$ can be considered as a local fitness function estimating the quality of the reconstruction for the element $\underline{x}_i$.

A suitable set S is constructed using a heuristic approach. In one example, this is done using a global fitness function $J_s$ which represents how closely the image of S represents all of the image of X in F. An example of a global fitness function is:

$$J_S = \frac{1}{M}\left[\sum_{x_i \in S}\left(\frac{K_{s,i}^t \cdot K_{s,s}^{-1} \cdot K_{s,i}}{k(x_i, x_i)}\right) + L\right] \quad (8)$$

In more detail, an example of how S is constructed is as follows.

Firstly, the element of X which gives the best global fitness result is selected. In other words, the element is chosen which has the largest global fitness value $J_s$ using equation (8) in this example. Alternatively, a first element can be chosen at random, or by inspection, to form the first element of S, $x_{s,1}$.

Next, another element of X is chosen and made a temporary member of S, and the value of $J_s$ is calculated on that basis for all the other elements of XL Then the temporary member of S is replaced by another member of X and $J_s$ is calculated again. Those steps are repeated for all the remaining elements of X. The element of X for which the global fitness function is a maximum is chosen as the permanent second member of S.

The steps set out in the previous paragraph are repeated to find subsequent members of S, each time looking for the highest value of the fitness function. The procedure is stopped when the fitness function exceeds a predetermined value. Alternatively, the procedure stops when S has a predetermined number of elements, or when S is a complete basis for the image of X in F. It is necessary to check the rank of the $K_{s,s}$ matrix to make sure it is possible to invert it. The procedure could be stopped when $K_{s,s}$ is no longer invertible.

Other more complex heuristics can also be used. Also, alternative fitness functions can be used. For example, the global fitness function can use the mean, the median or the minimum of the local fitness function, or other strategies. Alternatively, the fitness functions, global and local, can, for example, be based on an "error", using equation (6), in which case, optimization of S is indicated by a reduction in the global error. In each case, however, a kernel expression, such as in equation (7) is used.

The above technique is a 'forward' selection scheme, but other techniques such as involving 'backward' selection may also be used. As another example, all subsets of a given size L could be considered, and the best fit selected. In general terms, any suitable fitness based selection algorithm may be used.

In this way, a subset S of X can be found where the image of all elements of X in F under a mapping $\phi$ can be expressed approximately as linear combinations of the images of elements of S in F.

The selected set S may not be unique, but it provides a set of a given size L that preserves the structure of the data in F. It can be shown that for some kernels like the polynomial, the optimal value of $J_s$ is reached with only a few selected vectors.

All of the samples, or training data, in X, can be projected onto the image of S in F.

The transformation of a sample $x_i$ is given by the dot product projection:

$$z_i = \Phi_S^t \phi_i \quad (9)$$

Note that $z_i$ are obtained through a linear transformation. Other transformations can be considered, in particular, an orthogonal projection $z_i = (\Phi_S^t \Phi_S)^{-1} \Phi_S^t \phi_i$, which requires more computation and is not needed for many algorithms applied to the transformed data.

The set S can be used to reduce the computation involved in various kernel function approaches for data analysis, such as kernel PCA and kernel GDA, as described in our co-pending application EP00311253.9, the contents of which are incorporated herein by reference. EP00311253.9 gives examples of data subsets selected in accordance with the above technique for various data distributions and kernel functions.

We shall describe next support-vector machines (SVM in the following) followed by a discussion of how S is used in connection with a support vector machine.

The use of support vector machines is a known technique for classification and separation of data A full explanation of the underlying theory can be found in textbooks and academic papers, such as "A tutorial on support vector machines for pattern recognition" by C. J. C. Burges, from "Data mining and knowledge discovery 1998, pages 121-167. The key features will be summarized below.

Support vector machines (SVM in the following) use training data and implement a known structural risk minimization (SRM) induction-scheme. In general terms, the SVM is a two class linear classifier involving a hyperplane which separates two classes of data by a margin, as illustrated in FIG. 1.

Figure 1:
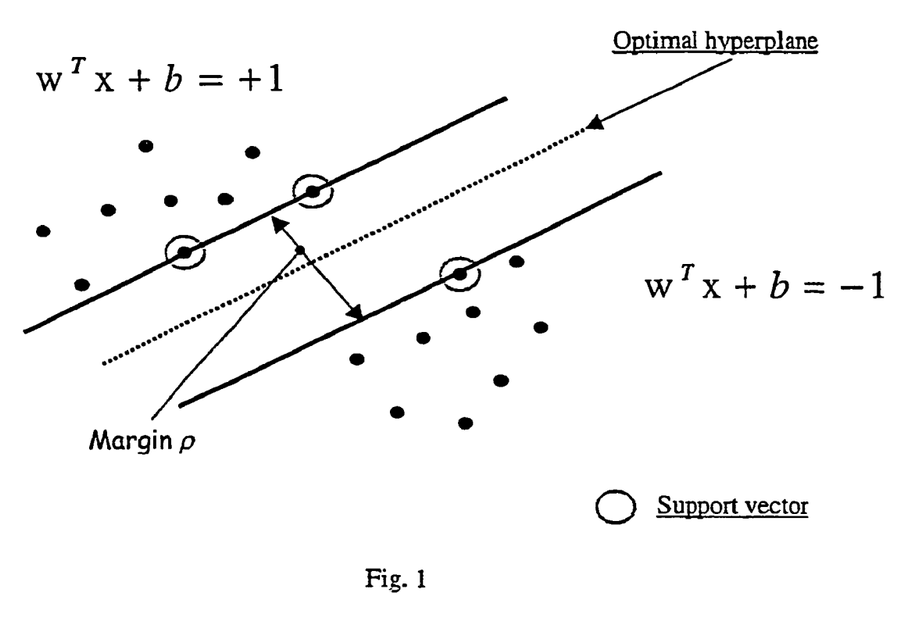
FIG. 1 is a graph illustrating a support vector machine.

FIG. 1 illustrates a basic example of a SVM for separable data.

Equation (10) provides a discriminant function where $\underline{w}$ is the vector normal to the hyperplane (HP) and $\underline{b}$ a bias, while $\underline{x}$ is a sample vector.

$$g(x) = w^T x + b \quad (10)$$

Samples belonging to cluster #1 have the label +1, while for cluster #2 the label is −1.

A set of training samples and their labels are defined as $\{(x_i, d_i)\}_{i=1}^N$. Then for the optimal HP ($w_0$, $b_0$) the following constraints hold, assuming that the data are separable:

$$w_0^T x_i + b_0 \geq +1 \text{ for } d_i = +1$$

$$w_0^T x_i + b_0 \leq -1 \text{ for } d_i = -1 \quad (11)$$

The relations (11) can be rewritten in more compact form as follows:

$$d_i(w^T x_i + b) \geq +1 \text{ for } i = 1, 2, 3, \ldots, N \quad (12)$$

The particular samples for which the first or second relation (11) is equality are called support vectors (SVs).

Given a set of training data, with N elements, and the general relation (12), the goal is to find values for $\underline{w}$ and $\underline{b}$ which maximize the margin separating the clusters.

This is set out below.

Let $x^s$ be a support vector associated with $d^s$ its class (+/−1).

$$g(x^s) = w_0^T x^s \pm b_0 = \pm 1 \text{ for } d^s = \pm 1 \quad (13)$$

With (13) we can compute the Euclidean distance $\|r\|$ from a SV to the HP:

$$r = \frac{g(x^s)}{\|w_0\|} \quad (14)$$

$$\|r\| = \frac{\|g(x^s)\|}{\|w_0\|} = \frac{1}{\|w_0\|}$$

Therefore the margin becomes:

$$\rho = \frac{2}{\|w_0\|} \quad (15)$$

Maximizing the margin leads to minimizing the length of w, subject to the constraint from the relation (12).

This problem is known as a quadratic optimization (or Quadratic Programming QP). It is a non-linear programming case where the cost function is quadratic on w while the constraints are linear. The problem can been stated as follows:

For a given training set $\{(x_i,d_i)\}_{i=1}^N$ find the weight vector w and the bias b minimizing the cost function:

$$L(w) = \frac{1}{2} w^T w \quad (16)$$

subject to:

$$d_i(w^T x_i + b) \geq +1 \quad \text{for } i = 1, 2, 3, \ldots, N$$

The factor ½ is here for the sake of the presentation (derivative). The problem is called the primal. It can be associated with a dual problem, this one will provide us a way to express the solution only with dot products of the input samples. We can solve the primal problem using the method of the Lagrange multipliers. Let call J the Lagrangian function:

$$J(w, b, \alpha) = \frac{1}{2} w^T w - \sum_{i=1}^N \alpha_i [d_i(w^T x_i + b) - 1] \quad (17)$$

The $\alpha_i$ are the non-negative Lagrange multipliers. We can demonstrate for J that when w and b are minimized $\alpha_i$ are maximized (a saddle point). After differentiation and setting results to zero, we get:

$$\frac{\partial J(w, b, \alpha)}{\partial w} = 0 \rightarrow w_0 = \sum_{i=1}^N \alpha_i d_i x_i \quad (18)$$

$$\frac{\partial J(w, b, \alpha)}{\partial b} = 0 \rightarrow \sum_{i=1}^N \alpha_i d_i = 0 \quad (19)$$

The solution vector $w_0$ is defined in terms of an expansion involving the N training samples.

However we still have to find the $\alpha_i$ coefficients, this can be done using the Kuhn-Tucker conditions [7]:

$$\alpha_i [d_i(w_0^T x_i + b) - 1] = 0 \quad \text{for } i = 1, 2, 3, \ldots, N \quad (20)$$

Therefore the Lagrange multipliers which only meet the equation 11 can assume non zero values. The duality theorem can be used now to find those coefficients. With (18) and (19) the equation (17) can be rewritten as:

$$Q(\alpha) = \sum_{i=1}^N \alpha_i - \frac{1}{2} \sum_{i=1}^N \sum_{j=1}^N \alpha_i \alpha_j d_i d_j x_i^T x_j \quad (21)$$

This is a QP problem too:

For a given training set $\{(x_i,d_i)\}_{i=1}^N$ find the Lagrange multipliers $\{\alpha_i\}_{i=1}^N$ maximizing the cost function:

$$Q(\alpha) = \sum_{i=1}^N \alpha_i - \frac{1}{2} \sum_{i=1}^N \sum_{j=1}^N \alpha_i \alpha_j d_i d_j x_i^T x_j$$

Subject to:

$$\sum_{i=1}^N \alpha_i d_i = 0 \quad \text{-a-}$$

$$\alpha_i \geq 0 \quad \text{for } i = 1, 2, 3, \ldots, N \quad \text{-b-}$$

The dual problem uses only training samples. The cost function depends only on the dot products of the sample; this is a very important property to be able to generalize SVM to non-linear problems. When the Lagrange coefficients have been found we can then express the optimal weight vector as follow:

$$w_0 = \sum_{i=1}^N \alpha_{0,i} d_i x_i \quad (22)$$

The $x_i$ associated with non-zero Lagrange multipliers are the SVs. In general there are less SVs than N. Therefore the expansion 13 does not need all the terms. The optimal bias b can be found using any SV and the equation (12):

$$b_0 = 1 - w_0^T x^s \text{ for } d^s = +1 \text{ and } b_0 = 1 + w_0^T x^s \text{ for } d^s = -1 \quad (23)$$

The discriminant function then becomes:

$$g(x) = w_0 x^T + b_0; \text{ or}$$

$$g(x) = x^T \sum_{i \in SVS} \alpha_{0,i} d_i x_i + b_0 \quad (24)$$

where SVS is the set of support vectors.

The above describes the case where the data is separable. SVMs can also handle cases where the data overlap. Details of the analysis can be found in the relevant literature, such as the Burges paper described above, and for simplicity and conciseness will not be repeated here.

The above example of a SVM describes a linear classification.

In order to build non-linear SVMs, a kernel function is used, as described above in relation to selecting S.

In order to address non-linear problems the kernel function and the linear SVM are merged. Equation (21) uses only dot products of the samples. Therefore it can be rewritten with kernels and leads to non-linear SVM using an implicit mapping of the data into the feature space F.

The QP method is then applied directly in F looking at an optimal HP (linear separation) there, as follows:

For a given training set $\{(x_i, d_i)\}_{i=1}^{N}$ find the Lagrange multipliers $\{\alpha_i\}_{i=1}^{N}$ maximizing the cost function:

$$Q(\alpha) = \sum_{i=1}^{N} \alpha_i - \frac{1}{2} \sum_{i=1}^{N} \sum_{j=1}^{N} \alpha_i \alpha_j d_i d_j k_{i,j} \qquad (25)$$

Subject to:

$$\sum_{i=1}^{N} \alpha_i d_i = 0 \qquad \text{-a-}$$

$$0 \leq \alpha_i \leq C \quad \forall i \qquad \text{-b-}$$

Even if the weight vector $\underline{w}$ cannot be expressed explicitly, we can compute its dot product with any sample in F. Therefore we can retrieve the discriminant function as follows ($\underline{b}_0$, any, is estimated using the equation (23) as usual):

$$g(x) = \sum_{i=1}^{N} \alpha_{0,i} d_i k_{i,j} + b_0 \qquad (26)$$

Remember that the expansion (26) is limited to the non-zero Lagrange multipliers. Therefore it is defined over the whole SV set (SVS) only and uses normally fewer terms than the learning set (N):

$$g(x) = \sum_{i \in SVS} \alpha_{0,i} d_i k_{i,j} + b_0 \qquad (27)$$

Even if the cardinality Ns of the SVS is generally speaking lower than N, it can still be quite high, which has consequences in terms of cost, memory and computing power.

A key feature of the present invention, is the use in combination of a SVM with the selected subset S. In the following, the elements of S are described as feature vectors (FVs), and the selection of S is described as feature vector selection (FVS).

Equation (27) can be modified working in F, using S and projection of the training data according to (9), as follows, bearing in mind that the support vectors belong to the training data and therefore can also be expressed in F using the image of S. Working in F, the SVM is a linear SVM.

First, equation (27) is expressed in terms of F, or in other words in terms of the image of the data and the support vectors in F.

$$g(x) = \sum_{i \in SVS_Z} \alpha_{0,i} d_i z_i^T z_j + b_0 \qquad (28)$$

where SVSz represents the image of each of the SVS in F.

The Lagrange multipliers, $d_i$, and $z_i$ define an explicit optimal weight vector $w_{z0}$. Therefore (28) can be expressed with only the projection z of any sample x onto the FVs, providing:

$$g(x) = w_{z0}^T z + b_0 \qquad (29)$$

where $$w_{z0} = \sum_{i \in SVS_Z} \alpha_{0,i} d_i z_i$$

Using the notation following equation (6) above, this becomes:

$$g(x_i) = w_{z0}^T K_{Si} + b_0 \qquad (30)$$

where $$w_{z0} = \sum_{j \in SVS_Z} \alpha_{0,j} d_j K_{Sj}$$

$$g(x_i) = \sum_{j=1}^{L} w_{z0,j} k(x_j, x_i) + b_0$$

It is to be noted that the discriminant equation (30) involves only L terms (that is, the size of S), which is often far less than the number of support vectors. Thus, the computation and processing involving in calculating the discriminant function is considerably reduced and made faster.

Figure 2:
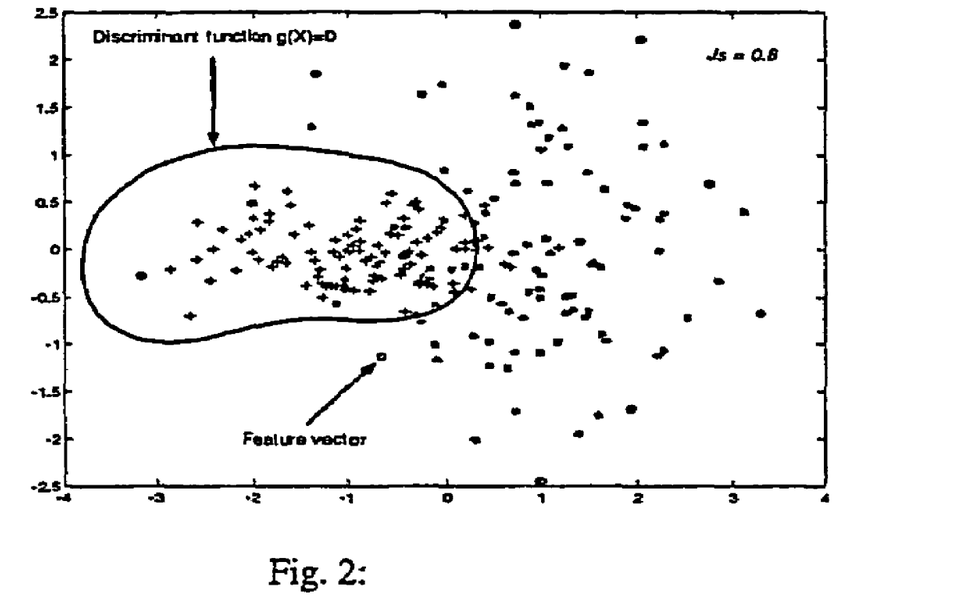
FIG. 2 is a graph illustrating data distributions and a discriminant function derived according to an embodiment of the invention.
Figure 3:
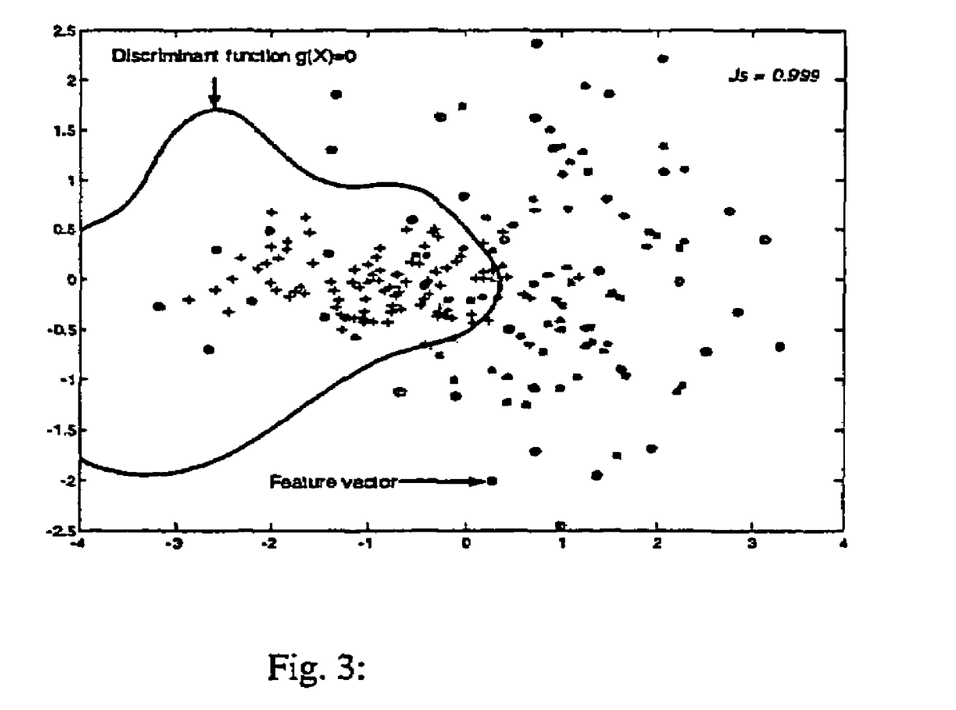
FIG. 3 is a graph illustrating another discriminant function.

FIGS. 2 and 3 each show an example of two clusters of data having normal distributions, in the input space. In the Figures, crosses represent data from one cluster, dots represent data from the other cluster, and circles around either dots or crosses indicate feature vectors among the samples.

The above techniques, combining FVS with SVM, were applied to the data, using slightly different criteria. More specifically, in the case shown in FIG. 2, a fitness value of $J_s$=0.8 was set, and 12 FV were selected. In the case shown in FIG. 3, the fitness value was set as $J_s$=0.999, and 38 FV were selected.

In both cases, the number of SVs is 52. In other words, using the standard non-linear SVM approach, the discriminate function involves an expansion of 52 terms. Using FVS, the discriminant function can be adequately expressed using only 12 FVs.

The black solid lines are the locus of the discriminate functions (for g(x).=0) in the input space X (image of the HP in F).

Experiments on various data have compared the discrimination performance using standard non-linear SVM with the SVM and FVS technique described above. The experiments have shown that the discrimination using SVM and FVS is as good and in some cases better than when using non-linear SVM.

Table 1 below gives some examples of performance in real life using a Gaussian kernel and data from databases used widely to test learning machines. The data can been retrieved from the following repository http://ida.first.gmd.de/~raetsch/data/benchmarks.htm.

TABLE 1

Classical SVM versus FVS/SVM
Performances for test data and amount of reduction
for implementation

| Database | Test Performance | | Reduction of FV versus SV | | |
|---|---|---|---|---|---|
| | SVM | FVS/SVM | #FVs | #SVs | Reduction |
| Banana | 89.16% | 89.52% | 31 | 96 | 67.71% |
| Heart | 80.66% | 83.78% | 36 | 67 | 46.27% |

There are many kernel functions, satisfying Mercer's Theorem (see WO 00/33262), that represent dot products in F and can be used in the invention. Some more examples are given below.

The spline kernel, where x and y are scalars:

$$k(x, y) = 1 + x \cdot y + x \cdot y \cdot \text{Min}(x, y) - \frac{(x+y)}{2} \cdot [\text{Min}(x, y)]^2 + \frac{\text{Min}(x, y)^3}{3}$$

The sigmoid kernel $$k(x, y) = k(x, y) = \frac{1}{1 + e^{-\frac{x^t \cdot y}{a}}}$$

with $a = 1$.

A $3^{rd}$ order polynomial kernel: $k(x,y) = (x^t \cdot y)^d (d=3, C=0)$,

The previous examples show good performances in generalization, which means they deal well with new vectors that were not in the original data set X.

To achieve this goal it is necessary to choose carefully the kernel, its parameter(s) (like σ), and the error level.

The choice of an appropriate kernel can be done by experimentation and trial and error, testing to see which give the best-results for the data under analysis. Alternatively, the choice can be made using experience and inspection of the distribution of the data.

For example, for data having a polynomial-type distribution, a polynomial kernel can give good results. It is also necessary to choose carefully various parameters, such as σ in the Gaussian kernel, and the predetermined level for the fitness function. Again, experimentation, experience and the shape of the data are guides.

According to the preferred embodiments of the invention, the general principles of the approaches described above are applied to currency items and currency validators. In other words, the approaches are applied to data that is derived from sensors for deriving measurements representative of characteristics of currency items. Referring to FIG. 2, for example, the axes of FIG. 2 could be considered to represent coin thickness and coin material of two different denominations of coin, or one genuine denomination and one fake, although in fact the distributions shown may not necessarily be representative of real life distributions. In many cases, such as in a banknote validator, the dimension of the feature vector formed from combining measurements of the banknote is much higher than 3 and so cannot be shown pictorially.

Figure 4:
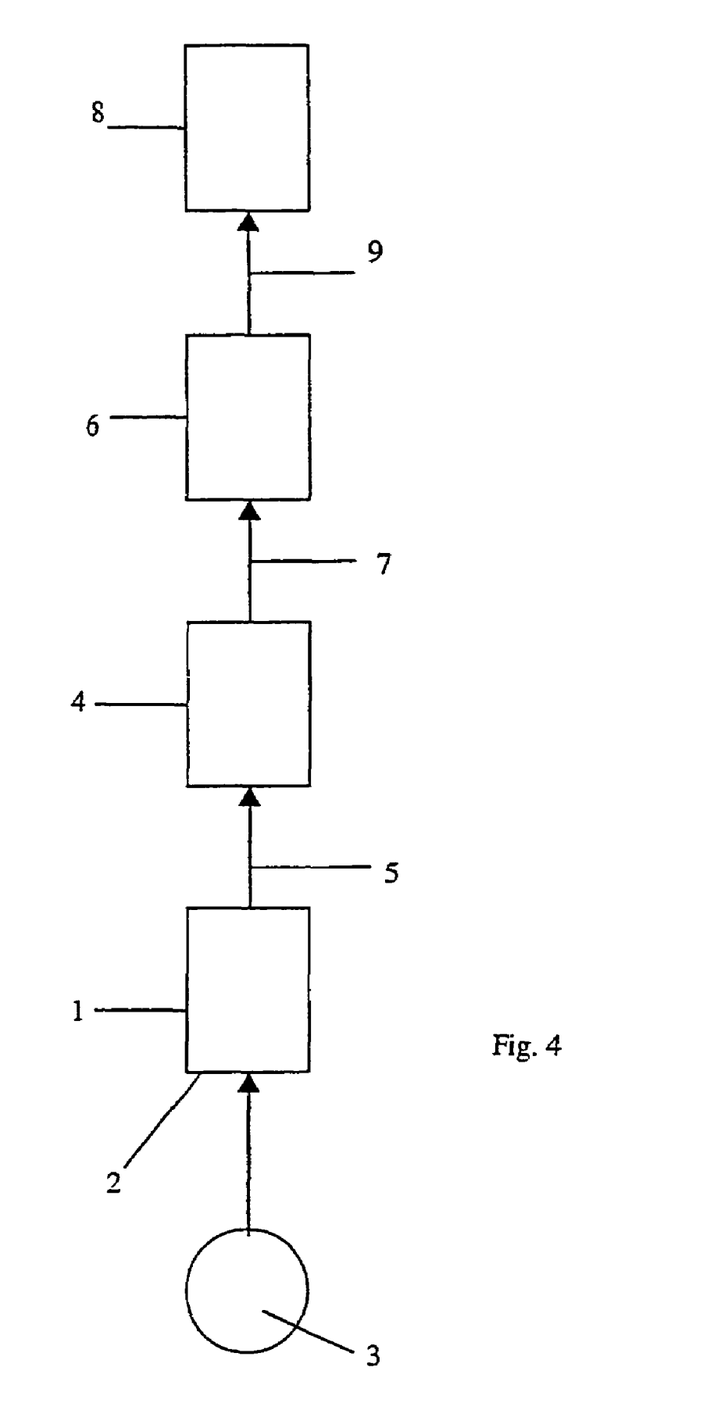

An embodiment of the invention relates to a coin validator, as shown in block diagram form in FIG. 4.

In FIG. 4, box 1 designates a measuring system which includes an inlet 2, a transport system in a form of a coin inlet and coin transport path (not shown) for presenting a sample 3 and a sensor system (not shown) for measuring physical quantities of the sample. The measuring system 1 is connected to a processing system 4 by means of a data bus 5. Processing system 4 is connected to a classifier 6 by means of a data bus 7. The output of the classifier 6 is connected to a utilization system 8 by means of a data output bus 9. The utilization system 8 is in this example a vending machine, but may also be, for example, a money exchange machine.

The measuring system 1 measures features of an inserted coin 3. The measured features are assembled into a feature vector having n elements, where each element corresponds to a measured feature by the processing system 4. In the present example, the sensor system measures values representative of the material, thickness and diameter of an inserted coin, using known techniques (see, for example, GB 2 254 949 A) and those values are the three elements of the corresponding feature vector. Briefly, each sensor comprises one or more coils in a self-oscillating circuit. In the case of the diameter and thickness sensors, a change in the inductance of each coil caused by the proximity of an inserted coin causes the frequency of the oscillator to alter, whereby a digital representation of the respective property of the coin can be derived. In the case of the conductivity sensor, a change in the Q of the coil caused by the proximity of an inserted coin causes the voltage across the coil to alter, whereby a digital output representative of conductivity of the coin may be derived. Although the structure, positioning and orientation of each coil, and the frequency of the voltage applied thereto, are so arranged-that the coil provides an output-predominantly dependent upon a particular one of the properties of conductivity, diameter and thickness, it will be appreciated that each measurement will be affected to some extent by other coin properties.

Of course, many different features representative of items of currency can be measured and used as the elements of the feature vectors, using various sensors such as optical sensors, magnetic sensors and other types of sensors, as are well known in the art. For example, in the case of a bank-note, the measured features can include, for example, the width of the note, the length of the note, and the intensity of reflected or transmitted light for the whole or part of the note. As an example, a measuring system can be arranged to scan a banknote along N lines using optical sensors. Each scan line contains L individual areas, which are scanned in succession. In each area, there are measurements of M different features. More specifically, for each area, measurements are made of the reflectance intensities of red, green and infra-red radiation. The total number of measurements for a banknote is therefore L×M×N. These measurements form the components of a feature vector for the respective specimen, so that the feature vector has L×M×N components. Alternatively, the measurements can be processed in a different way to obtain a feature vector representative of the measured specimen. For example, local feature vectors for each measured area can be formed made up of the M measurements for that area, so that each local feature vector has M components. The local feature vectors can then be summed over the area of the banknote to obtain an M dimensional feature vector representative of the entire specimen.

The feature vector is then input to the classifier 6. The classifier 6 determines whether the sample belongs to any one of predetermined classes, using the feature vector and predetermined classification criteria including a separating function. If the sample is identified as belonging to an acceptable denomination, then it is accepted and the corresponding value is credited. If the sample is identified as belonging to a known counterfeit group, it is rejected.

In this example, the system is for classifying two denominations of coins and one known counterfeit.

The derivation of the separating function will be described below.

The population distribution of the denominations are analysed as discussed below.

Initially, samples of each of the denominations of interest and each of the known counterfeit are measured and corresponding feature vectors are formed. The samples may be formed using the sensor system of the validator of interest, but in this embodiment, the samples are derived from a plurality of corresponding sensor systems, to take account of variations and manufacturing tolerances, in sensors systems in different validators as sold and installed in the field. The feature vectors from the samples, when plotted, for example, on a n-dimensional scatter graph, (where n is the number of measured features) fall roughly into clusters. These measured samples are then analysed and used to derive a separating function. In this example, 50 samples for each denomination and 50-samples of the counterfeit, are used and measured over 10 samples of sensor systems. The resulting cluster data is analysed and used to derive a classifying function, or discriminant function, using the approach as described above. More specifically, the samples, or training data, are processed and used to derive the set S, or FVS, and values for $\underline{w}_{z0,j}$ and $\underline{b}_0$, to produce the discriminant function $g(x)$ in equation (30). Here, the threshold is set to zero. The classifying function is then stored in a memory of the processing system 4 of a particular validator.

Classification for coins of an unknown denomination is then performed as follows. A coin is inserted into the validator. The inserted coin is sensed, and measurements representative of the material, thickness and diameter are obtained The processing system then performs the following steps. A feature vector, $\underline{x}$, is derived from the measured values. The values of $g(\underline{x})$ is calculated using equation (30). In this example, if $g(\underline{x})>0$, the coin is classified as genuine and if $g(\underline{x})<0$, the coin is classified as a fake.

According to this approach, the validator needs to store very little data (eg the data required in equation (30), that is S, k, $w_{z0}$ and $b_0$ and the threshold) to perform the classification task to a high degree of accuracy. This reduces costs and computing effort and increases the speed of classification.

A SVM is essentially a two class classifier. For a currency validator for validating a plurality of denominations, a combination of a number of SVMs may be required. For example, for each denomination, a SVM may be used for classifying between two clusters of genuine items and fake items of the denomination, or SVMs can be combined in a binary tree structure. The SVM may be combined with other tests. For example, a preliminary test may determine the denomination of a currency item, using one of the various known techniques for denominating items of currency, followed by a suitable validation technique, using a SVM.

In the above example, the discrimination threshold is set to zero, but other thresholds may be used, such as +/−0.5.

The analysis of the sample values for the initial data analysis and the derivation of the separating function can be done, for example, using a microprocessor. Similarly, the classifier 6 may be a microprocessor.

The methods of the embodiment described above are equally applicable to a banknote or other currency item or indeed to classification of other sorts of items that are sensed by an item sensor to produce measured values.

In the described embodiment, samples of the denominations of interest are used to derive the classifying function. Other items can also be used, such as tokens or washers.

The above techniques can also be used for other types of data, and is not limited to classifying data derived from currency items.

The detailed discussion above relates to data which is separable, but the invention is not limited to such arrangements. The invention may be modified using techniques known in the art for "soft" margins, for example, where the training data overlaps.

The invention claimed is:

1. A method of deriving a function for classifying items of currency, the method comprising:
   processing training data vectors corresponding to features of a plurality of currency items,
   forming a subset of training data vectors used as a basis to reconstruct input space vectors in a feature space,
   subsequently deriving a support vector machine classification function involving a plurality of support vectors from reconstructed training data vectors and
   storing the support vector machine classification function in a currency validator processing system,
   wherein the support vector machine classification function is applied by the currency validator processing system to received items of currency.

2. A method as claimed in claim 1 wherein the support vector machine classification function is in the form $$g(x) = x^T \sum_{i \in SVS} \alpha_{O,i} d_i x_i + b_0.$$

3. A method as claimed in claim 1, wherein forming the subset of training data vectors comprises selecting training data vectors such that an image of the subset of training data vectors is representative of an image of the training data in the first space, wherein the first space corresponds to a kernel mapping of a second space corresponding to the space of input data.

4. A method as claimed in claim 3 wherein the subset is such that the image of each element of the training data vectors is expressed approximately as a linear combination of the image of elements of the subset.

5. A method as claimed in claim 4 wherein the subset is such that a measurement of the approximation meets a predeterminined condition.

6. A method as claimed in claim 3 comprising:
   (a) deriving a temporary subset;
   (b) calculating the value of a fitness function representing the closeness of an approximation of the image of the remaining elements of the data set in terms of the image of the temporary subset;
   (c) deriving another temporary subset and repeating (b); and
   (d) comparing the values of the fitness function for each temporary subset, and selecting the temporary subset for which the value of the fitness function indicates the closest approximation.

7. A method as claimed in claim 6 in which (a) to (d) are repeated to form a sequence of temporary subsets of increasing or decreasing size.

8. A method as claimed in claim 6 wherein (a) to (d) are repeated until a predetermined condition is met.

9. A method as claimed in claim 7 wherein the fitness function uses the kernel mapping.

10. A method as claimed claim 3 wherein the support vector machine classification function is in the form $$g(x_i) = \sum_{j=1}^{L} w_{z0,j} k(x_j, x_i) + b_0.$$

11. A method as claimed in claim 1 comprising deriving a plurality of measurements from at least one currency sensor and a plurality of currency items, and forming the training data vectors from the measurements.

12. A method as claimed in claim 1 wherein individual elements of the data set comprise a plurality of measurements corresponding to a plurality of characteristics of sensed items.

13. A method as claimed in claim 11 wherein the currency sensor comprises a document sensor.

14. A method as claimed in claim 13 wherein the document sensor comprises a banknote sensor.

15. A method as claimed in claim 11 wherein the currency sensor comprises a coin sensor.

16. A method as claimed in claim 3 wherein the kernel mapping is a Gaussian, polynomial, sigmoid, hyperbolic tangent or spline kernel.

17. A currency validator storing a classification function in the form of a support vector machine derived by a method comprising:
   processing training data vectors corresponding to features of a plurality of currency items;
   forming a subset of training data vectors used as a basis to reconstruct input space vectors in a feature space; and
   subsequently deriving a support vector machine classification function involving a plurality of support vectors from the reconstructed training data vectors.

18. A method of classifying a currency item in a currency classifier comprising deriving at least one measurement of the currency item from at least one currency sensor, classifying the currency item using a classification function, wherein the classification function comprises a support vector machine derived by a method comprising:
   processing training data vectors corresponding to features of a plurality of currency items;
   forming a subset of training data vectors used as a basis to reconstruct any vector in a feature space; and
   subsequently deriving a support vector machine classification function involving a plurality of support vectors from the reconstructed training data vectors.

19. A method as claimed in claim 18 wherein the classification function is in the form of either $$g(x) = x^T \sum_{i \in SVS} \alpha_{O,i} d_i x_i$$

or $$g(x_i) = \sum_{j=1}^{L} w_{z0,j} k(x_j, x_i) + b_0.$$

20. A validator comprising
   means for sensing currency items to produce measured values representing characteristics of the items,
   means for storing a function, and
   means for validating a currency item using the measured values and the function,
      wherein the function comprises a support vector machine derived by a method comprising:
   processing training data vectors corresponding to features of a plurality of currency items;
   forming a subset of training data vectors used as a basis to reconstruct any vector in a feature space; and
   subsequently deriving a support vector machine classification function involving a plurality of support vectors from the reconstructed training data vectors.

21. A validator as claimed in claim 20, wherein the function is in the form of either $$g(x) = x^T \sum_{i \in SVS} \alpha_{O,i} d_i x_i \text{ or}$$

$$g(x_i) = \sum_{j=1}^{L} w_{z0,j} k(x_j, x_i) + b_0.$$

22. A method as claimed in claim 8 wherein (a) to (d) are repeated until a fitness function meets a predetermined condition, wherein the predetermined condition includes at least one of the following conditions:
   (i) a value of the fitness function is less than or equal to a predetermined value;
   (ii) a value of the fitness function is greater than or equal to a predetermined value;
   (iii) a subset is of a predetermined size; or
   (iv) $K_{s,s}$ is no longer numerically invertible.

23. A method as claimed in claim 1 further comprising using the support vector machine classification function to classify an item of currency in the currency validator processing system.

* * * * *

UNITED STATES PATENT AND TRADEMARK OFFICE
CERTIFICATE OF CORRECTION

PATENT NO. : 7,648,016 B2 Page 1 of 1
APPLICATION NO. : 10/518691
DATED : January 19, 2010
INVENTOR(S) : Gaston Baudat It is certified that error appears in the above-identified patent and that said Letters Patent is hereby corrected as shown below:

Title page, insert the following heading and priority information:

--Related U.S. Application Data

(60) Provisional application no. 60/389,942, filed on June 19, 2002.--.

Column 14, claim 5, line 47, "predeterminined" should be --predetermined--;

Column 15, claim 18, line 51, "subsequentlv" should be --subsequently--.

Signed and Sealed this

Twenty-eighth Day of September, 2010

David J. Kappos
*Director of the United States Patent and Trademark Office*